US011746803B2

(12) United States Patent
Bauernfeind et al.

(10) Patent No.: US 11,746,803 B2
(45) Date of Patent: Sep. 5, 2023

(54) HYDRAULIC SYSTEM FOR A CYCLICALLY WORKING MOLDING MACHINE AND METHOD FOR OPERATION OF SUCH A HYDRAULIC SYSTEM

(71) Applicant: ENGEL AUSTRIA GmbH, Schwertberg (AT)

(72) Inventors: Stephan Bauernfeind, Ried in der Riedmark (AT); Pascal Bader, Muenster (AT); Martin Berger, Ernsthofen (AT); Klaus Hubert Gattringer, Tragwein (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 0 days.

(21) Appl. No.: 17/546,638

(22) Filed: Dec. 9, 2021

(65) Prior Publication Data
US 2022/0186756 A1 Jun. 16, 2022

(30) Foreign Application Priority Data

Dec. 10, 2020 (AT) .............................. A 51075/2020

(51) Int. Cl.
*F15B 21/08* (2006.01)
*B29C 45/67* (2006.01)
(Continued)

(52) U.S. Cl.
CPC ............ *F15B 21/087* (2013.01); *B29C 45/67* (2013.01); *B29C 45/82* (2013.01); *F15B 1/04* (2013.01);
(Continued)

(58) Field of Classification Search
CPC .................. F15B 1/04; F15B 2211/275; F15B 2211/6651; B29C 45/67; B29C 45/82; B29C 2045/824; B29C 2045/76685
See application file for complete search history.

(56) References Cited

U.S. PATENT DOCUMENTS

| 5,688,535 | A  | * | 11/1997 | Koda ................... B29C 45/5008 425/149 |
| 6,120,711 | A  | * | 9/2000  | Takizawa ................ B29C 45/82 264/40.5 |
| 6,478,572 | B1 | * | 11/2002 | Schad ................... B29C 48/252 425/150 |
| 7,168,944 | B2 |   | 1/2007  | Schad |

(Continued)

FOREIGN PATENT DOCUMENTS

| DE | 199 58 256 | 6/2001 |
| DE | 10 2008 038 520 | 2/2010 |

(Continued)

OTHER PUBLICATIONS

Drexer, P. et al., The Hydraulic Trainer, vol. 3, Project management and construction of hydraulic systems, Mannesmann Rexroth GmbH, 1988, pp. 121-122 (with partial machine translation).

*Primary Examiner* — Thomas E Lazo
(74) *Attorney, Agent, or Firm* — Wenderoth, Lind & Ponack, L.L.P.

(57) ABSTRACT

A hydraulic system for a cyclically operating shaping machine includes at least one hydraulic drive unit for cyclically driving a component of the shaping machine at a start time; at least one pump; and at least one hydraulic accumulator which can be discharged for driving the at least one hydraulic drive unit and which can be charged up by operation of the at least one pump. An open-loop or closed-loop control unit is also provided for control of the at least one pump. The open-loop or closed-loop control unit is adapted to operate the at least one pump continuously until
(Continued)

the start time of the at least one hydraulic drive unit to charge up the at least one hydraulic accumulator until the start time of the hydraulic drive unit.

20 Claims, 2 Drawing Sheets

(51) Int. Cl.
*B29C 45/82* (2006.01)
*F15B 1/04* (2006.01)

(52) U.S. Cl.
CPC ............ *B29C 2945/76702* (2013.01); *B29C 2945/76866* (2013.01); *B29C 2945/76933* (2013.01); *B29C 2945/76936* (2013.01); *F15B 2211/275* (2013.01)

(56) References Cited

U.S. PATENT DOCUMENTS

| | | | |
|---|---|---|---|
| 7,347,965 B2* | 3/2008 | Klaus | B29C 45/54 |
| | | | 425/149 |
| 9,346,207 B2 | 5/2016 | Yuan | |
| 10,180,135 B2* | 1/2019 | Caldwell | F15B 7/006 |
| 2003/0090019 A1* | 5/2003 | Amano | F15B 1/033 |
| | | | 425/149 |
| 2004/0109917 A1* | 6/2004 | Schad | B29C 45/5008 |
| | | | 425/589 |
| 2012/0093968 A1* | 4/2012 | Yuan | B29C 45/77 |
| | | | 425/542 |
| 2015/0132426 A1 | 5/2015 | Yuan et al. | |
| 2017/0284388 A1* | 10/2017 | Caldwell | F04B 1/063 |

FOREIGN PATENT DOCUMENTS

| | | | |
|---|---|---|---|
| DE | 102008038520 A1 * | 2/2010 | ............ F15B 11/00 |
| DE | 10 2009 037 648 | 2/2011 | |
| DE | 10 2009 059 025 | 6/2011 | |

\* cited by examiner

HYDRAULIC SYSTEM FOR A CYCLICALLY WORKING MOLDING MACHINE AND METHOD FOR OPERATION OF SUCH A HYDRAULIC SYSTEM

BACKGROUND OF THE INVENTION

The present invention concerns a hydraulic system for a cyclically operating shaping machine, a shaping machine having such a hydraulic system, a method of operating a hydraulic system for a cyclically operating shaping machine, as well as a computer program and a computer-readable storage medium.

Hydraulic systems of the general kind set forth are adapted to cyclically drive a component of the shaping machine at a start time by at least one hydraulic drive unit, wherein for example piston-cylinder units are used as the drive unit. In addition, corresponding hydraulic systems have at least one pump and at least one hydraulic accumulator, wherein the at least one hydraulic accumulator can be discharged to drive the at least one hydraulic drive unit and can be charged up by operation of the at least one pump.

The term shaping machines can denote injection molding machines, injection presses, presses and the like. Shaping machines in which the plasticized material is fed to an open molding tool are certainly conceivable. Hereinafter, the state of the art is to be outlined by reference to an injection molding machine. A similar aspect applies generally to shaping machines.

It is known from the state of the art in the case of injection molding machines to perform various functions within a cycle (for example, opening or closing an injection molding mold, actuating core pullers, actuating ejectors, a linear injection movement or also a rotation of a plasticising screw) by specific hydraulic drives.

For the actuation of such hydraulic drive units, it is known from the state of the art to provide hydraulic accumulators in the hydraulic system, whereby it is possible to charge up the hydraulic accumulator by a few pumps, in the extreme case a single pump, and one or more drive units of the injection molding machine can be operated by way of the hydraulic accumulator.

A hydraulic accumulator entails the advantage that relatively large amounts of energy can be quickly retrieved in order to drive the drive units, as is required in the specific case of the injection molding machine, for example when opening or closing an injection molding mold or in the injection of a plasticized material, in which respect high hydraulic pressures and large volume flows are demanded at cyclically recurring points of contention in the movement.

The requirement of the at least one hydraulic drive unit, that fluctuates considerably within a cycle of the injection molding machine (in particular for closing the mold, injecting the molten material, post-pressing, opening the mold and ejecting a molding) is buffered by way of at least one hydraulic accumulator.

The specific need for a hydraulic fluid and a hydraulic system pressure depends on the nature of the production process of the injection molding machine, in which respect that can vary greatly, depending on the respective molding to be produced.

It is known from the state of the art for the hydraulic pump to be operated discontinuously, in which case a maximum pressure and a minimum pressure are established as threshold values for the hydraulic accumulator. As soon as the pressure hi the hydraulic accumulator falls below the minimum pressure, the pump is activated and the hydraulic accumulator is charged up until the maximum pressure is reached. The pump is deactivated again when the maximum pressure is reached.

For charging up the hydraulic accumulator, the at least one pump is operated with a delivery output which is as high as possible in order to charge up the hydraulic accumulator again as quickly as possible so that the injection molding process of the injection molding machine is not influenced by the discharging of the hydraulic accumulator.

Accordingly, it is known in the state of the art for pumps for charging a hydraulic accumulator to be driven in most cases at 80% to 100% (mostly at 100%) of the maximum delivery output thereof in order to achieve charging times which are as quick as possible (in other words: to achieve charging ramps which are as steep as possible).

However, that discontinuous operation of pumps in which the pumps are operated at their maximum or near to their maximum delivery output has an adverse effect on the service lives of the pump.

In addition, an increased energy consumption is required to drive the pumps as during the charging phase they have to be accelerated from the stopped condition up to a maximum delivery output and are then operated until a desired hydraulic pressure in the hydraulic accumulator is reached. That constantly recurring maximum acceleration of the pumps causes an unpleasant high level of noise.

A further disadvantage is that, by virtue of the fact that the hydraulic accumulator is charged to its maximum and remains in that state for some time, hydraulic energy is lost by leaks, whereby the energy efficiency of the system is adversely influenced.

SUMMARY OF THE INVENTION

The object of the invention is to provide a hydraulic system and a method of operating a hydraulic system, in which the energy efficiency is increased and/or the service lives are increased and/or the expenditure for maintenance operations is reduced and/or the noise level is reduced.

That object is attained by a hydraulic system for a cyclically operating shaping machine as described below, a shaping machine having such a hydraulic system, a method of operating such a hydraulic system, a computer program product for performing such a method, and a computer-readable storage medium having the computer program product therein.

According to the invention, the hydraulic system includes the following components:
- at least one hydraulic drive unit, in particular a piston-cylinder unit, for cyclically driving a component of the shaping machine at a start time,
- at least one pump, and
- at least one hydraulic accumulator which can be discharged for driving the at least one hydraulic drive unit and which can be charged up by operation of the at least one pump.

An open-loop or closed-loop control unit is provided for open-loop or closed-loop control of the at least one pump, and the open-loop or closed-loop control unit is adapted to operate the at least one pump continuously until a start time of the at least one hydraulic drive unit to charge up the at least one hydraulic accumulator until the start time of the hydraulic drive unit.

By virtue of the charging of the hydraulic accumulator, targetedly directed at the start time, by the continuously operating pump, the hydraulic accumulator can be charged up until a start time of the drive for a component of the shaping machine by the at least one hydraulic drive unit (and thus discharging of the hydraulic accumulator). The hydraulic accumulator, in contrast to the state of the art, does not have to remain in a charged state until the movement starts.

In that way, it is possible to reduce leakage losses in the hydraulic system whereby the energy efficiency of the hydraulic system is increased.

In addition, a charging time of the pump can be maximized in specifically targeted fashion whereby it is no longer necessary to operate the pump at maximum delivery output, but the drive output can be adapted to the available time (whereby, for example, the maximum rotary speed of the pump can be reduced). The pump is thus less severely loaded and less maximum power output is needed for operation, and that has an effect on energy efficiency and the service life of the pump.

Continuous operation of the pump and the avoidance of a "start-stop operation" also enhances the service life of the pump by a multiple.

The noise level is reduced by continuous operation of the pump and by the background noise being reduced by a reduced pump delivery output.

Furthermore, it was surprisingly found that continuous charging of the hydraulic accumulator over a longer period of time with the at least one pump requires a lower level of energy than a shorter charging time for the hydraulic accumulator by an increased delivery output from the at least one pump.

The term shaping machines can be used to denote injection molding machines, injection presses, presses and the like.

The open-loop or closed-loop control unit can be adapted to vary a delivery output of the at least one pump, preferably by varying the rotary speed of the at least one pump.

Also, for example, the delivery output of the at least one pump can be varied by a variable blade geometry of the at least one pump.

Preferably, the open-loop or closed-loop control unit is adapted to continuously operate the at least one pump during an entire cycle time of the cyclically operating shaping machine.

Particularly preferably, the at least one pump is operated continuously during an entire shaping process on the part of the shaping machine. The at least one pump can run with a continuous delivery output not only during a cycle but over a plurality of cycles.

The open-loop or closed-loop control unit can be adapted on the basis of a hydraulic pressure of the hydraulic system and/or a delivery volume required during an entire cycle time of the cyclically operating shaping machine to calculate an average delivery output and to provide for open-loop or closed-loop control of the at least one pump having regard to the average delivery output.

Consequently, a required hydraulic volume and/or a required hydraulic pressure can be calculated by the at least one open-loop or closed-loop control unit during the cycle time of the shaping machine. Alternatively, however, that required hydraulic volume or that required hydraulic pressure can be predetermined.

By means of that required hydraulic pressure and/or hydraulic volume, the open-loop or closed-loop control unit can define a desired storage state of the hydraulic accumulator (+/−defined acceptable pressure and volume deviations). Consequently, the open-loop or closed-loop control unit can calculate therefrom an average delivery output for the at least one pump, on the basis of which then the at least one pump can be operated continuously during the cycle.

The term delivery output in the context of the present application is used to denote the volume flow which is implemented per unit of time by the at least one pump. That delivery output can be varied by a variation in the drive power of the at least one pump (for example, by varying the rotary speed of the at least one pump). On the other hand, however, it is also possible to adjust the delivery output of the at least one pump by a variable blade geometry of the at least one pump, which is possible with suitable structural configurations of certain pumps.

The cycle time of the hydraulic system can be predetermined, for example, by the shaping machine, whereby the times for the hydraulic system are afforded by way of the shaping machine and the settings at the shaping machine. The cycle time of the shaping machine, in turn, depends on a shaped component to be produced, the number of components to be produced per cycle, a material used (from which the shaped component or components are produced) and similar process parameters.

The open-loop or closed-loop control unit is adapted on the basis of a hydraulic pressure of the hydraulic system and/or a delivery volume ascertained during a preceding cycle of the shaping machine to calculate an average delivery output of the at least one pump and to provide for open-loop or closed-loop control of the at least one pump having regard to the average delivery output.

Preferably, the open-loop or closed-loop control unit is adapted on the basis of a hydraulic pressure of the hydraulic system and/or a delivery volume ascertained during a preceding cycle of the shaping machine to calculate a hydraulic pressure and/or delivery volume required at the start time of the at least one hydraulic drive unit and to charge the hydraulic accumulator—preferably substantially precisely at the start time—with the required delivery volume and/or hydraulic pressure by way of the at least one pump.

As a basis for the delivery volume and/or the hydraulic pressure, an ascertained value of the immediately previously performed cycle of the shaping machine is used.

Preferably, a certain number of ascertained values for the delivery volume and/or the hydraulic pressure of immediately previously performed cycles (for example 5 cycles) of the shaping machine are used, from which particularly preferably a basis for the delivery volume and/or the hydraulic pressure is calculated (for example by an average value or a median).

An ascertained value of one or more reference cycles of the shaping machine can be used as the basis for the delivery volume and/or the hydraulic pressure.

The open-loop or closed-loop control unit can be designed to adapt a rotary speed of the at least one pump to an operating condition of the at least one hydraulic drive unit, wherein preferably:
  the delivery output of the at least one pump is increased during a movement of the at least one hydraulic drive unit, and/or
  the delivery output of the at least one pump is reduced during a stoppage in the movement of the at least one hydraulic drive unit.

Thus, for example, during a movement of the at least one hydraulic drive unit, the delivery output of the at least one pump can be increased in order to support the increased required delivery volume of hydraulic fluid of the at least one hydraulic drive unit, which is required by the at least one hydraulic accumulator, by the at least one pump.

On the other hand, if the at least one hydraulic unit remains in a stoppage state, the delivery output of the at least one pump can be reduced as in a moment of the stoppage of movement of the at least one hydraulic drive unit a reduced fluid flow of the hydraulic fluid is required.

The at least one hydraulic drive unit can be supplied with hydraulic fluid by the hydraulic accumulator and the at least one pump during an operating condition in which it is being driven.

The term operating state in which the at least one hydraulic drive unit is in a stoppage condition can also denote a state in which for example a linear drive unit like a piston-cylinder unit exerts a pressure on the component of the shaping machine without however performing any noteworthy movements.

The at least one drive unit can be connected to the at least one pump by at least one hydraulic line.

Preferably, the at least one hydraulic accumulator can be connected to the at least one pump with the at least one hydraulic line connecting at least one hydraulic drive unit.

The at least one pump can be driven by at least one electric motor, preferably a synchronous motor.

The expression open-loop or closed-loop control unit can be used to denote such components of the hydraulic system which allow control of actuators, drives and/or drive controllers, which includes in particular so-called "stored programmable controls" (SPC). That can also involve the reception of sensor data and the implementation of computation processes for a closed-loop control operation, which can be carried out in real time depending on the respective control scheme.

The open-loop or closed-loop control unit of the hydraulic system can be implemented by a central machine control of the shaping machine or can take over the functions thereof.

Protection is further claimed for a method of operating a hydraulic system for a cyclically operating shaping machine, wherein the hydraulic system comprises the following components:
at least one hydraulic drive unit, in particular a piston-cylinder unit, for cyclically driving a component of the shaping machine at a start time,
at least one pump, and
at least one hydraulic accumulator which can be discharged for driving the at least one hydraulic drive unit and which can be charged up by operation of the at least one pump.

The at least one pump is continuously operated until the start time of the at least one hydraulic drive unit to charge up the at least one hydraulic accumulator until the start time of the hydraulic drive unit.

Protection is also claimed for a computer program product including commands which, upon execution of the program by the computer, cause the same to carry out a method according to the invention and/or to configure an open-loop or closed-loop control unit of a hydraulic system according to the invention.

Furthermore, protection is also claimed for a computer-readable storage medium including commands which, upon execution of the program by a computer, cause the same to carry out a method according to the invention and/or to configure an open-loop or closed-loop control unit of a hydraulic system of the invention.

The hydraulic accumulator can have, for example, at least one bladder accumulator. It would alternatively also be possible to provide piston accumulators or other kinds of hydraulic accumulators.

BRIEF DESCRIPTION OF THE DRAWINGS

Further advantages by way of example and details of the invention are illustrated in the Figures and set forth in the specific description hereinafter, in which.

DETAILED DESCRIPTION OF THE INVENTION

Figure 1:
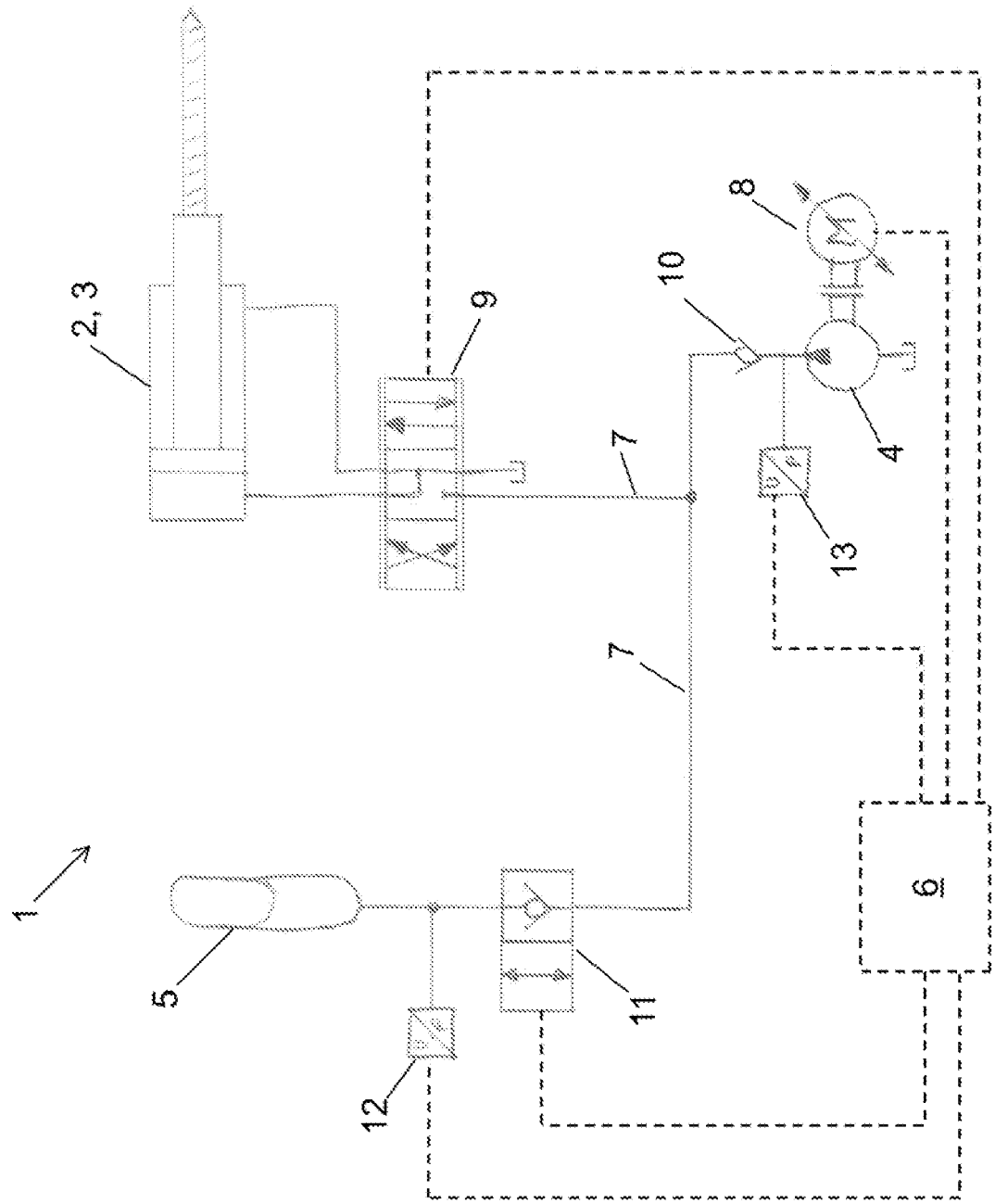
FIG. 1 shows a hydraulic system according to an embodiment of the invention.

FIG. 1 shows a first embodiment of a hydraulic system 1 for a shaping machine.

That hydraulic system 1 has a hydraulic drive unit 2 adapted to drive a component (not shown for the sake of better clarity of the drawing) of a shaping machine at a start time.

The hydraulic drive unit 2 of the hydraulic system 1 is in the form of a double-acting piston-cylinder unit 3 which is actuated in known manner by way of a hydraulic valve 9 (more precisely: an electrically actuated 4/3-way valve).

In addition, the hydraulic system 1 has a hydraulic accumulator 5 which can be charged up by a pump 4 and a (first) hydraulic line 7. A hydraulic valve 11 is provided for changing the hydraulic accumulator 5 between a charging position and a discharging position.

The pump 4 is driven by an electric motor 8 and is in the form of a fixed displacement pump, wherein a delivery output of the pump 4 can be adjusted by variation in the rotary speed of the electric motor 8.

The pump 4 is connected to the hydraulic accumulator 5 by the hydraulic line 7, wherein a further (second) hydraulic line 7 for supplying the hydraulic drive unit 2 branches off between the pump 4 and the hydraulic accumulator 5.

In addition, between the branch connection and the pump 4 is a non-return valve which prevents an uncontrolled backflow because of pressure fluctuations from the hydraulic system 1 to the pump 4.

The hydraulic system 1 further comprises an open-loop or closed-loop control unit 6 which is connected in signal-conducting relationship to the electric motor 8, the hydraulic valve 9 and the hydraulic valve 11 (the signal-conducting connections are shown in this view by the dashed lines).

A (first) hydraulic sensor 12 is further provided between the hydraulic valve 11 and the hydraulic accumulator 5. A further (second) hydraulic sensor 13 is provided between the pump 4 and the non-return valve 10. Those hydraulic sensors 12, 13 are adapted to provide a signal which is representative of the pressure and a through-flow amount and which can also be provided by a signal-conducting connection for an open-loop or closed-loop control unit 6.

A representative signal for a pump output of the pump 4 can be established by the sensor 13 and the delivery flow.

A representative signal for a charging state or a discharging state of the hydraulic accumulator 5 can be established by the hydraulic sensor 12.

The open-loop or closed-loop control unit 6 is adapted to continuously operate the pump 4, wherein hydraulic fluid is continuously conveyed into the hydraulic system 1 by the pump 4 and the hydraulic accumulator 5 is charged up.

As soon as actuation of the hydraulic valve 9 occurs and thus a movement of the hydraulic drive unit 2 is produced by the open-loop or closed-loop control unit 6, the hydraulic valve 11 is also actuated so that the stored hydraulic energy in the hydraulic accumulator 5 can escape and serves to drive the hydraulic drive unit 2.

As the pump 4 runs continuously, upon a movement of the hydraulic drive unit 2, the hydraulic drive unit 2 is also driven to a small extent by the pump 4 (in addition to the communicated hydraulic energy of the hydraulic accumulator 5).

Figure 2:
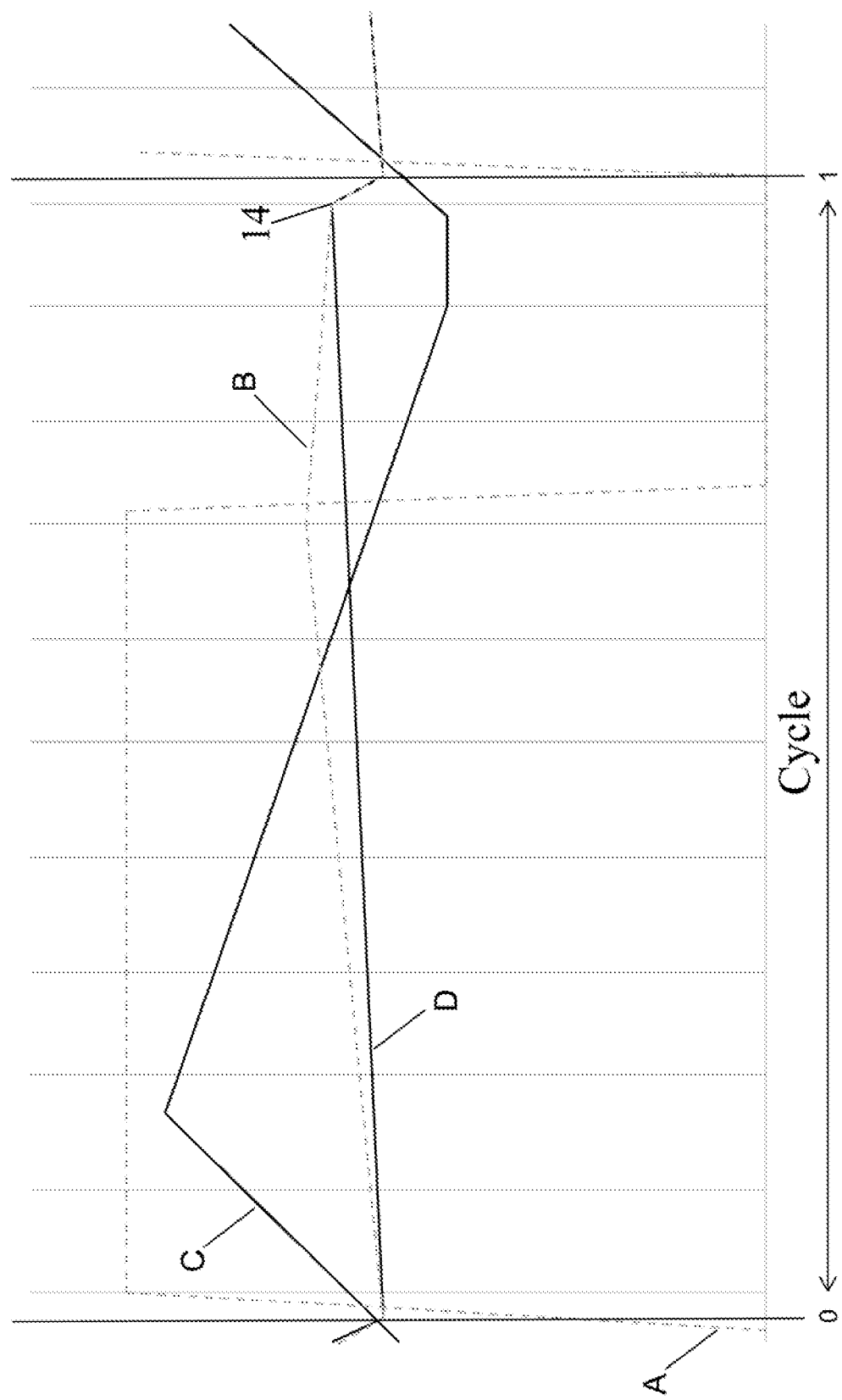
FIG. 2 shows an embodiment of a method according to the invention in comparison with the state of the art by means of a diagram.

FIG. 2 shows a comparison of a method according to the invention of operating a hydraulic system with a method known from the state of the art.

Thus, in a method of operating a hydraulic system 1 according to the state of the art, firstly the rotary speed of the pump 4 is increased from the stopped condition to a maximum value, as shown by the dashed line A.

The pump 4 is kept at its maximum rotary speed until a desired pressure is reached in the hydraulic system 1 and thus in the hydraulic accumulator 5.

That pressure in the hydraulic accumulator 5 and in the hydraulic system 1 is shown by the line B (in the method according to the state of the art). When that desired pressure is reached, the pump 4 is shut down, which again is to be seen by the line A.

That pressure in the hydraulic accumulator 5, however, falls slightly due to leakage losses, as can be seen from the line B. That slight loss in pressure due to leakage represents an energy loss in the system.

At the start time 14, the hydraulic drive unit 2 is driven by the hydraulic system 1 whereby the pressure in the hydraulic system 1 abruptly drops as the hydraulic energy which is stored in the hydraulic system 1 and the hydraulic accumulator 5 is required by the hydraulic drive unit for moving a component of the shaping machine.

When the pressure in the hydraulic system 1 and thus in the hydraulic accumulator 5 falls to a lower pressure threshold value, the rotary speed of the pump 4 is again increased to its maximum to build up a desired pressure in the hydraulic accumulator 5.

As can be clearly seen from the dashed line in the state of the art, however, it is always necessary to build up a higher pressure by means of the pump 4 than is necessary at the start time 14 of the hydraulic drive unit as leakage losses have to be taken into account.

The lines C and D show a method according to an embodiment of the present invention, wherein the line C represents the rotary speed of the pump 4 and the line D represents a pressure in the hydraulic system 1.

It is to be noted that, in the embodiment of the invention, the pump 4 is operated continuously (with a slight variation in the rotary speed, shown on an exaggerated scale in the Figure).

The line D shows how the pressure in the hydraulic accumulator 5 rises continuously until the start time 14 at which the desired hydraulic pressure is reached.

Shortly before actuation of the hydraulic drive 2, the rotary speed of the pump 4 is increased again so that, during actuation of the hydraulic drive unit 2, additional hydraulic power is provided by the pump 4 for the hydraulic drive unit 2, which can be used in addition to the hydraulic energy delivered by the hydraulic accumulator 5.

After actuation of the hydraulic drive unit 2, the rotary speed of the pump 4 can again be reduced as indicated by the line C in order to charge the hydraulic accumulator 5.

It can be seen how the rotary speed of the pump 4 in the embodiment of the invention (which is shown by the lines C and D in FIG. 2) swings about an average rotary speed.

An example of the calculation of a pilot control of the rotary speed of the pump 4 as indicated by line C is to be described in greater detail hereinafter.

In a first step, the required rotary speed n for continuous charging of the hydraulic accumulator 5 is calculated from the displacement volume $V_p$ (according to manufacturer details) of the pump 4 and a volume flow $Q_p$. The volume flow $Q_p$ is in that case ascertained in a preceding cycle of the shaping machine and used for the calculation as a benchmark.

$$Q_P = n * V_P$$

From that, it is possible to calculate the power output $P_p$ of the pump by way of the pressure difference $\Delta p_p$ (results from the desired pressure in the hydraulic system) at the pump 4. The differential pressure $\Delta p_p$ (the desired pressure in the hydraulic system) in that case also arises from a preceding cycle of the shaping machine.

$$P_P = \Delta p_p * Q_P$$

The required rotary speed of the pump 4 can now be calculated by the time variation of the pressure of cycles considered in the hydraulic accumulator 5 of the hydraulic system 1.

In that case, firstly by way of the calculation formula in respect of the pump output $P_{PM}$ which (as can be seen hereinafter) arises out of a prevailing pressure in the hydraulic accumulator $p_{Akku}$ and the already previously mentioned desired volume flow $Q_p$ which originates by measurement from a preceding cycle of the shaping machine will be converted to the desired volume flow $Q_p$.

By means of the knowledge that the volume flow arises out of the multiplicands rotary speed of the pump $n_{CAC,des}$ and the displacement volume of the pump $V_p$ (Q=n*V) the desired rotary speed of the pump $n_{CAC,des}$ can now be calculated.

$$P_{PM} = p_{Akku} * Q_{P,des}$$

$$Q_{P,des} = \frac{P_{PM}}{p_{Akku}}$$

$$n_{CAC,des} = \frac{P_{PM}}{p_{Akku} * V_P}$$

That rotary speed is then also averaged over the range being considered (for example a plurality of cycles). In that way, a constant rotary speed is achieved.

That constant rotary speed, however, can have the result that on the one hand the hydraulic accumulator is overcharged or on the other hand it is not completely charged.

Therefore, that rotary speed presetting also has to be overwritten by a control action (as described hereinafter).

By way of cycle time analysis, it is possible to ascertain the time $t_{cycle}$ which is available for charging the hydraulic accumulator. The charging volume $\Delta V$ can be calculated from that time $t_{cycle}$, the calculated rotary speed $n_{CAC,des}$ and the displacement volume $V_p$ of the pump 4.

$$\Delta V = n_{CAC,des} * V_p * t_{cycle}$$

The accumulator pressure $p_{2,e}$ which can potentially be reached is calculated therefrom, being reached by way of the charging volume $\Delta V$:

$$p_{2,e} = \frac{p_0}{\left(\left(\frac{p_0}{p_1}\right)^{\frac{1}{\kappa}} - \frac{\Delta V}{V_0 * x}\right)^{\kappa}}$$

The difference between the attainable accumulation pressure $p_{2,e}$ over the constant rotary speed and the set maximum pressure value for the hydraulic accumulator is used as a control variable. In the final effect then, rotary speed presetting is effected for example by way of the following condition:

$$n_{real}=n_{CAC,des}+k_P*(p_2-p_{2,e})+k_I*(p_2-p_{2,e})$$

The two parameters $k_P$ and $k_I$ represent in that case the parameters for example a PI controller which is known from the state of the art and which can be a component part of the open-loop or closed-loop control unit 6.

In principle, however, any other known variant of a controller can be used as part of the open-loop or closed-loop control unit 6 for controlling the rotary speed of the pump 4 by way of the electric motor 8.

In addition, a factor $f_V$ can be introduced in order to store the ascertained parameter $p_{2,e}$ over a certain number of cycles and if necessary to permanently adapt the pilot control, that is to say with the rotary speed $n_{CAC,des}$ of the pump 4.

LIST OF REFERENCES

1 hydraulic system
2 hydraulic drive unit
3 piston-cylinder unit
4 pump
5 hydraulic accumulator
6 open-loop or closed-loop control unit
7 hydraulic line
8 electric motor
9 hydraulic valve
10 non-return valve
11 hydraulic valve
12 hydraulic sensor
13 hydraulic sensor
14 start time
A rotary speed of the pump according to the state of the art
B pressure in the hydraulic accumulator according to the state of the art
C rotary speed of the pump according to the embodiment
D pressure in the hydraulic accumulator according to the embodiment
$Q_p$ volume flow of the pump
n rotary speed of the pump
$\Delta p_p$ pressure difference
$V_P$ displacement volume of the pump
$P_P$ output of the pump
$\Delta p_p$ differential pressure at the pump
$P_{Akku}$ pressure in the hydraulic accumulator
$Q_{P,des}$ required volume flow of the pump
$T_{P,des}$ required rotary speed of the pump
$t_{cycle}$ time for charging the hydraulic accumulator
$x_{Akku}$ number of the hydraulic accumulators
$P_0$ gas filling pressure of the hydraulic accumulator
$P_1$ min. working pressure of the hydraulic accumulator
$p_2$ max. working pressure of the hydraulic accumulator
$\kappa$ polytropic exponent
$\Delta V_x$ removal amount per cycle
$n_{CAC,des}$ calculated rotary speed of the pump
$n_{real}$ rotary speed specification by the PI controller
$p_{2,e}$ differential pressure of the achievable hydraulic pressure

The invention claimed is:

1. A hydraulic system for a cyclically operating shaping machine, the hydraulic system including:
a hydraulic drive unit for cyclically driving a component of the shaping machine at a start time;
a pump;
a hydraulic accumulator to be discharged for driving the hydraulic drive unit and to be charged up by operation of the pump; and
an open-loop or closed-loop control unit for open-loop or closed-loop control of the pump, wherein the open-loop or closed-loop control unit is adapted to operate the pump continuously until the start time of the hydraulic drive unit to charge up the hydraulic accumulator until the start time of the hydraulic drive unit,
wherein the open-loop or closed-loop control unit is configured to calculate, based on a delivery volume and/or a hydraulic pressure of the hydraulic system, a rotary speed of the pump to generate an average delivery output of the pump, and to charge the hydraulic accumulator with the required delivery volume and/or the required hydraulic pressure by the pump.

2. The hydraulic system as set forth in claim 1, wherein the open-loop or closed-loop control unit is configured to vary a delivery output of the pump.

3. The hydraulic system as set forth in claim 2, wherein the open-loop or closed-loop control unit is configured to vary a delivery output of the pump by varying the rotary speed of the pump.

4. The hydraulic system as set forth in claim 1, wherein the open-loop or closed-loop control unit is adapted to continuously operate the pump during an entire cycle time of the cyclically operated shaping machine.

5. The hydraulic system as set forth in claim 1, wherein the open-loop or closed-loop control unit is configured to calculate, based on a hydraulic pressure of the hydraulic system and/or a delivery volume required during an entire cycle time of the cyclically operating shaping machine, an average delivery output, and to provide for open-loop or closed-loop control of the pump with regard to the average delivery output.

6. The hydraulic system as set forth in claim 1, wherein the open-loop or closed-loop control unit is configured to adjust a rotary speed of the pump to an operating condition of the hydraulic drive unit.

7. The hydraulic system as set forth in claim 6, wherein the open-loop or closed-loop control unit is configured to:
increase the delivery output of the pump during a movement of the hydraulic drive unit, and/or
reduce the delivery output of the pump during a stoppage in the movement of the hydraulic drive unit.

8. The hydraulic system as set forth in claim 1, wherein the hydraulic drive unit is connected to the pump by a hydraulic line.

9. The hydraulic system as set forth in claim 8, wherein the hydraulic accumulator is connected to the pump with the hydraulic line connecting the hydraulic drive unit.

10. The hydraulic system as set forth in claim 1, wherein the pump is driven by an electric motor.

11. The hydraulic system as set forth in claim 10, wherein the electric motor is a synchronous motor.

12. The hydraulic system as set forth in claim 1, wherein:
the hydraulic accumulator has a bladder accumulator,
the drive unit is configured to produce a linear drive and/or a rotational drive of a closing unit and/or an injection unit of the shaping machine,
the open-loop or closed-loop control unit is formed by a central machine control of the shaping machine, and/or
the hydraulic system further comprises a hydraulic valve for open-loop or close-loop control of the hydraulic drive unit.

13. A shaping machine comprising the hydraulic system as set forth in claim 1.

14. A method of operating the hydraulic system as set forth in claim 1,
   wherein the method comprises continuously operating the pump until the start time of the hydraulic drive unit to charge up the hydraulic accumulator until the start time of the hydraulic drive unit.

15. A computer program embodied on a non-transitory computer-readable medium, the computer program comprising commands to allow a computer to perform the method as set forth in claim 14.

16. The hydraulic system as set forth in claim 1, wherein the hydraulic drive unit is a piston-cylinder unit.

17. The hydraulic system as set forth in claim 1, wherein the open-loop or closed-loop control unit is configured to charge the hydraulic accumulator at substantially precisely the start time.

18. A hydraulic system for a cyclically operating shaping machine, the hydraulic system including:
   a hydraulic drive unit for cyclically driving a component of the shaping machine at a start time;
   a pump;
   a hydraulic accumulator to be discharged for driving the hydraulic drive unit and to be charged up by operation of the pump; and
   an open-loop or closed-loop control unit for open-loop or closed-loop control of the pump, wherein the open-loop or closed-loop control unit is adapted to operate the pump continuously until the start time of the hydraulic drive unit to charge up the hydraulic accumulator until the start time of the hydraulic drive unit,
   wherein the open-loop or closed-loop control unit is configured to calculate, based on a hydraulic pressure of the hydraulic system and/or a delivery volume ascertained during a preceding cycle of the shaping machine, an average delivery output of the pump, and to provide for open-loop or closed-loop control of the pump with regard to the average delivery output.

19. A hydraulic system for a cyclically operating shaping machine, the hydraulic system including:
   a hydraulic drive unit for cyclically driving a component of the shaping machine at a start time;
   a pump;
   a hydraulic accumulator to be discharged for driving the hydraulic drive unit and to be charged up by operation of the pump; and
   an open-loop or closed-loop control unit for open-loop or closed-loop control of the pump, wherein the open-loop or closed-loop control unit is adapted to operate the pump continuously until the start time of the hydraulic drive unit to charge up the hydraulic accumulator until the start time of the hydraulic drive unit,
   wherein the open-loop or closed-loop control unit is configured to calculate, based on a hydraulic pressure of the hydraulic system and/or a delivery volume ascertained during a preceding cycle of the shaping machine, a hydraulic pressure and/or delivery volume required at the start time of the at least one hydraulic drive unit and to charge the hydraulic accumulator with the required delivery volume and/or hydraulic pressure by the pump.

20. The hydraulic system as set forth in claim 19, wherein the open-loop or closed-loop control unit is further configured to charge the hydraulic accumulator substantially precisely at the start time with the required delivery volume and/or hydraulic pressure by the pump.

\* \* \* \* \*